E. HELLRIEGEL.
EYEGLASSES.
APPLICATION FILED JUNE 4, 1913.
1,092,360.
Patented Apr. 7, 1914.
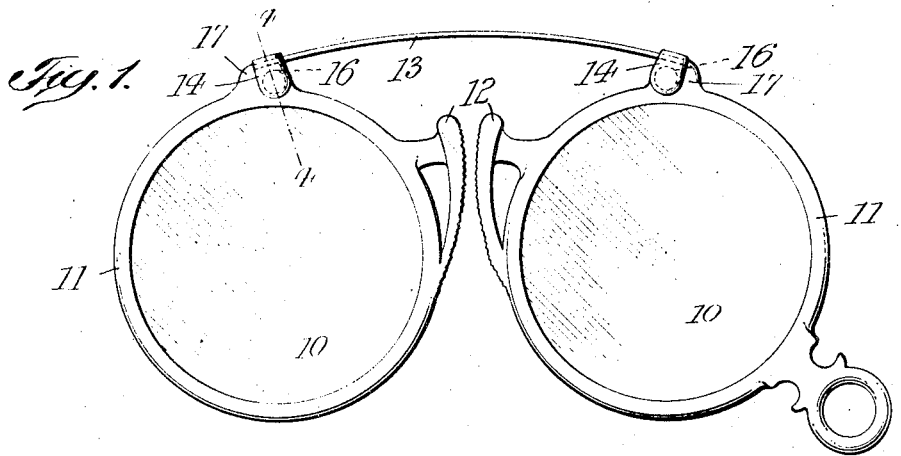
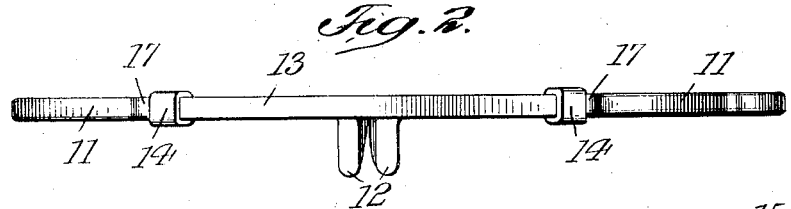
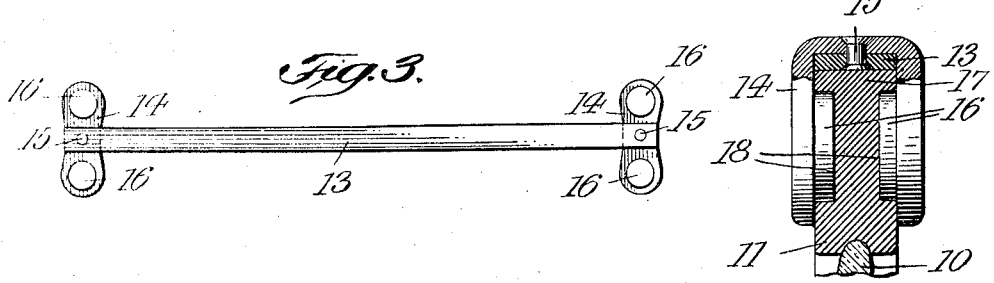
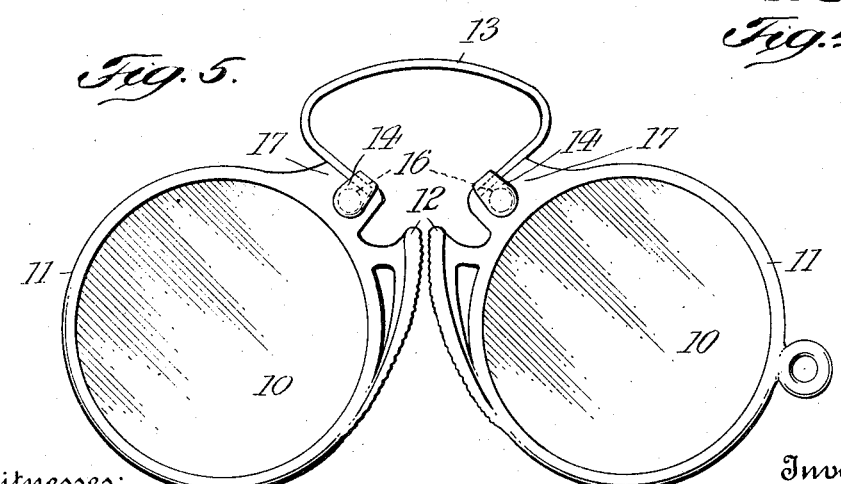
Witnesses:
Inventor
Edmund Hellriegel
By his Attorneys

UNITED STATES PATENT OFFICE.

EDMUND HELLRIEGEL, OF BROOKLYN, NEW YORK, ASSIGNOR TO THE WAGNER COMB MANUFACTURING CO., OF NEW YORK, N. Y., A CORPORATION.

EYEGLASSES.

1,092,360.  Specification of Letters Patent.  Patented Apr. 7, 1914.

Application filed June 4, 1913. Serial No. 771,633.

*To all whom it may concern:*

Be it known that I, EDMUND HELLRIEGEL, a citizen of the United States, residing at Brooklyn, county of Kings, and State of New York, have invented new and useful Eyeglasses, of which the following is a specification.

This invention relates to eyeglasses of novel construction, and more particularly to novel and efficient means for securing the spring to the frame or mounting.

By my invention the attachment between spring and mounting is effected in a reliable manner without the use of rivets or similar connecting means, while furthermore the spring can be readily detached from the mounting for the purposes of replacement or repair.

In the accompanying drawing: Figure 1 is a front view of eyeglasses embodying my invention; Fig. 2 a top view; Fig. 3 a top view of the spring showing the clasps before being bent; Fig. 4 an enlarged cross section on line 4—4, Fig. 1, and Fig. 5 a front view of eyeglasses showing a modified form of the spring.

Each of the lenses 10 of the eyeglasses is set in a frame 11 carrying a nose guard 12 as usual. The spring or bridging member 13 of the eyeglasses is provided at each end with a U-shaped clasp 14 made of bendable material and shown to be attached to spring 13 by a rivet 15. The inner face of each clasp-shank is provided with a protuberance or head 16, which may be made in the form of a disk as shown, the two heads of each clasp facing each other (Fig. 4). Each frame 11 has an integral upper lug 17 which is adapted to be straddled by clasp 14 and is provided with a pair of opposed recesses 18 adapted to snugly accommodate the heads 16 thereof.

Before assembling the parts, the two shanks of each clasp should diverge somewhat from each other, and after the clasps have been projected over the lugs 17, their shanks are pressed into parallelism, whereby the ends of the bridging member are pressed firmly against the top of the lugs while the heads 16 are made to enter the recesses 18, so that in this way spring 13 becomes securely attached to frames 11. By again spreading the shanks, their heads will become withdrawn from the recesses, so that the spring may now be readily removed.

In Fig. 1, the spring 13 is shown to be made in the form of a continuous arch, while in Fig. 5, it is shown to be provided with inwardly deflected ends, the form of the spring being open to various modifications which will readily suggest themselves to those skilled in the art.

In Fig. 3, I have shown the spring 13 with the clasps 16 before the latter are bent, the clasps being of course brought into their required U-form prior to their engagement with the frames.

It will be seen that by my invention, the spring can be quickly attached to or removed from the frames in an exceedingly simple manner, which does not require any prolonged fitting or difficult manipulation. So also the bendable clasps are entirely free of the lenses and may be firmly forced with their heads into the recessed lugs of the frame without breaking the glass. Finally as the ends of the bridging member bear firmly upon lugs 17 of frames 11, the latter are prevented from swinging upon heads 16 as upon fulcrums, so that in this way the proper spacing between the two frames is at all times maintained.

I claim:

An eyeglass mounting comprising a pair of frames having lugs provided with a pair of opposed recesses, a bridging member having a pair of U-shaped bendable clasps that straddle the lugs and are provided with inwardly extending protuberances that engage the recesses, the ends of the bridging member bearing against the tops of the lugs, whereby the frames are locked to the bridging member against independent movement on the protuberances.

EDMUND HELLRIEGEL.

Witnesses:
PHILIP J. WAGNER,
FREDERICK WAGNER.